US006977023B2

(12) United States Patent
Abrams

(10) Patent No.: US 6,977,023 B2
(45) Date of Patent: Dec. 20, 2005

(54) SCREEN PRINTED RESIN FILM APPLIQUE OR TRANSFER MADE FROM LIQUID PLASTIC DISPERSION

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 272 days.

(21) Appl. No.: 10/265,206

(22) Filed: Oct. 4, 2002

(65) Prior Publication Data

US 2003/0072889 A1 Apr. 17, 2003

Related U.S. Application Data

(60) Provisional application No. 60/332,647, filed on Nov. 21, 2001, provisional application No. 60/344,862, filed on Nov. 8, 2001, provisional application No. 60/327,642, filed on Oct. 5, 2001.

(51) Int. Cl.[7] .......................... B44C 1/65; B32B 31/00; B05B 31/00; B05D 3/00

(52) U.S. Cl. ...................... 156/230; 156/247; 156/250; 156/272.2; 156/277; 156/279; 427/258; 427/458; 427/553; 428/323; 428/343

(58) Field of Search ............................ 428/195.1, 343; 427/458, 258, 553; 156/230, 247, 250, 242.2, 156/277, 279

(56) References Cited

U.S. PATENT DOCUMENTS

| | | | |
|---|---|---|---|
| D66,035 S | 11/1924 | McIntosh | |
| 1,905,989 A | 4/1933 | Safir et al. | |
| D108,581 S | 2/1938 | Robinson | |
| D114,814 S | 5/1939 | Hoos | |
| D122,192 S | 8/1940 | De Moreau | |
| D125,860 S | 3/1941 | Haas | |
| D162,533 S | 3/1951 | Goldfarb | D92/21 |
| 2,636,837 A | 4/1953 | Summers | 154/123 |
| D195,245 S | 5/1963 | Edesess | |
| 3,529,986 A | 9/1970 | Kappas et al. | 117/17 |
| 3,657,060 A | 4/1972 | Haigh | 161/73 |
| 3,734,813 A * | 5/1973 | Pohl | 428/162 |
| 3,775,205 A | 11/1973 | Hermann et al. | 156/72 |
| 3,793,050 A | 2/1974 | Mumpower, Jr. | 117/17.5 |
| 3,816,060 A | 6/1974 | Koskolos | 431/350 |
| 3,816,211 A | 6/1974 | Haigh | 156/309 |
| 3,956,552 A | 5/1976 | Geary | 428/88 |
| 3,989,869 A | 11/1976 | Neumaier et al. | 428/254 |
| 4,018,956 A | 4/1977 | Casey | 428/86 |
| 4,034,134 A | 7/1977 | Gregorian et al. | 428/86 |
| 4,035,532 A | 7/1977 | Gregorian et al. | 428/90 |
| 4,102,562 A | 7/1978 | Harper et al. | 350/105 |
| 4,120,713 A | 10/1978 | Jensen et al. | 156/72 |

(Continued)

FOREIGN PATENT DOCUMENTS

AT E 93 557 B 8/1989

(Continued)

OTHER PUBLICATIONS

Abrams, Brown, "Part II: Flocking" ScreenPrinting (Jun. 1987).

(Continued)

*Primary Examiner*—Rena Dye
*Assistant Examiner*—Camie S. Thompson

(57) ABSTRACT

The present invention is directed to the use of a resin dispersion to form a variety of decorative transfers. The transfers can include a decorative medium such as flock. Primary and secondary carriers are used in some embodiments of the invention. The resin dispersion, when gelled and fused, can provide a free-form design article that can be readily applied to any desirable substrate, such as a textile.

72 Claims, 10 Drawing Sheets

U.S. PATENT DOCUMENTS

| | | | | |
|---|---|---|---|---|
| 4,142,929 | A | 3/1979 | Otomine et al. | 156/72 |
| 4,160,851 | A | 7/1979 | Lienert et al. | 427/379 |
| 4,201,810 | A | 5/1980 | Higashiguchi | 428/90 |
| 4,269,885 | A | 5/1981 | Mahn | 428/216 |
| 4,273,817 | A | 6/1981 | Matsuo et al. | 428/90 |
| 4,282,278 | A | 8/1981 | Higashiguchi | 428/90 |
| 4,292,100 | A | 9/1981 | Higashiguchi | 156/72 |
| 4,314,813 | A | 2/1982 | Maskai | 8/468 |
| 4,314,955 | A | 2/1982 | Boden et al. | 264/51 |
| 4,340,623 | A | 7/1982 | Justus | 427/361 |
| 4,369,157 | A | 1/1983 | Conner | 264/246 |
| 4,385,588 | A | 5/1983 | Bennetot | 118/638 |
| 4,388,134 | A | 6/1983 | Long et al. | 156/248 |
| 4,396,662 | A | 8/1983 | Higashiguchi | 428/90 |
| 4,405,401 | A | 9/1983 | Stahl | 156/248 |
| 4,423,106 | A | 12/1983 | Mahn | 428/207 |
| 4,539,166 | A | 9/1985 | Richartz et al. | 264/45.1 |
| 4,574,018 | A | 3/1986 | Masuda et al. | 156/72 |
| 4,582,658 | A | 4/1986 | Reichmann et al. | 264/45.1 |
| 4,652,478 | A | 3/1987 | Maii | 428/43 |
| 4,668,323 | A | 5/1987 | Lenards et al. | 156/242 |
| 4,681,791 | A | 7/1987 | Shibahashi et al. | 428/96 |
| 4,687,527 | A | 8/1987 | Higashiguchi | 156/72 |
| 4,741,791 | A | 5/1988 | Howard et al. | 156/72 |
| 4,790,306 | A | 12/1988 | Braun et al. | 128/206.12 |
| 4,793,884 | A | 12/1988 | Horikiri | 156/247 |
| 4,797,320 | A | 1/1989 | Kopp et al. | 428/316.6 |
| 4,810,321 | A | 3/1989 | Wank et al. | 156/244.23 |
| 4,810,549 | A | 3/1989 | Abrams et al. | 428/88 |
| 4,812,247 | A | 3/1989 | Fahner et al. | 252/511 |
| 4,834,502 | A | 5/1989 | Bristol et al. | 350/322 |
| 4,980,216 | A | 12/1990 | Rompp | 428/90 |
| 5,008,130 | A | 4/1991 | Lenards | 427/206 |
| 5,009,950 | A | 4/1991 | Wagner et al. | 428/290 |
| 5,041,104 | A | 8/1991 | Seal | 604/367 |
| 5,043,375 | A | 8/1991 | Henning et al. | 524/372 |
| 5,047,103 | A | 9/1991 | Abrams et al. | 156/72 |
| 5,053,179 | A | 10/1991 | Masui et al. | 264/257 |
| 5,108,530 | A | 4/1992 | Niebling, Jr. et al. | 156/245 |
| 5,154,871 | A | 10/1992 | Wagner et al. | 264/255 |
| 5,198,277 | A | 3/1993 | Hamilton et al. | 428/92 |
| 5,207,851 | A | 5/1993 | Abrams et al. | 156/230 |
| 5,217,563 | A | 6/1993 | Niebling et al. | 156/382 |
| 5,217,781 | A | 6/1993 | Kuipers | 428/85 |
| 5,248,536 | A | 9/1993 | Du Katz | 428/40 |
| 5,274,039 | A | 12/1993 | Sirinyan et al. | 525/130 |
| 5,346,746 | A | 9/1994 | Abrams | 428/195 |
| 5,350,474 | A | 9/1994 | Yamane | 156/240 |
| D365,342 | S | 12/1995 | Evenson et al. | D14/114 |
| D366,654 | S | 1/1996 | Lovegrove et al. | D14/114 |
| 5,489,359 | A | 2/1996 | Yamane | 156/540 |
| 5,534,099 | A | 7/1996 | Yamamoto | 156/230 |
| 5,597,637 | A | 1/1997 | Abrams et al. | 428/90 |
| 5,622,587 | A | 4/1997 | Barthelman | 156/251 |
| 5,654,395 | A | 8/1997 | Jackson, Jr. et al. | 528/308.3 |
| 5,693,400 | A | 12/1997 | Hamilton et al. | 428/89 |
| 5,762,379 | A | 6/1998 | Salmon et al. | 283/91 |
| 5,766,397 | A | 6/1998 | Jones | 156/230 |
| 5,804,007 | A | 9/1998 | Asano | 156/72 |
| 5,858,156 | A | 1/1999 | Abrams et al. | 156/230 |
| 5,900,096 | A | 5/1999 | Zemel | 156/233 |
| 5,912,065 | A | 6/1999 | Kukoff | 428/195 |
| 5,922,436 | A | 7/1999 | Banfield et al. | 428/100 |
| 5,981,009 | A | 11/1999 | Iacono et al. | 428/40.1 |
| 6,010,764 | A | 1/2000 | Abrams | 428/90 |
| 6,083,332 | A | 7/2000 | Abrams | 156/72 |
| 6,102,686 | A | 8/2000 | Eschenfelder | 425/388 |
| 6,110,560 | A | 8/2000 | Abrams | 428/90 |
| 6,113,149 | A | 9/2000 | Dukatz | 283/91 |
| 6,146,485 | A | 11/2000 | Iacono et al. | 156/230 |
| 6,170,881 | B1 | 1/2001 | Salmon et al. | 283/91 |
| 6,171,678 | B1 | 1/2001 | Holeschovsky et al. | 428/97 |
| 6,202,549 | B1 | 3/2001 | Mitsam et al. | 101/27 |
| 6,224,707 | B1 * | 5/2001 | Lion | 156/230 |
| 6,249,297 | B1 | 6/2001 | Lion | 347/171 |
| 6,257,866 | B1 | 7/2001 | Fritz et al. | 425/387.1 |
| 6,264,775 | B1 | 7/2001 | Holeschovsky et al. | 156/72 |
| 6,277,312 | B1 | 8/2001 | Hansen et al. | 264/132 |
| 6,296,908 | B1 | 10/2001 | Reihs et al. | 427/393.5 |
| 6,299,715 | B1 | 10/2001 | Langsdorf et al. | 156/72 |
| 6,387,472 | B1 | 5/2002 | Reck et al. | 428/195 |
| 6,428,877 | B1 | 8/2002 | Suss et al. | 428/195 |
| 6,451,148 | B1 | 9/2002 | Jenner | 156/230 |
| 2003/0152779 | A1 * | 8/2003 | Kondo et al. | 428/424.2 |

FOREIGN PATENT DOCUMENTS

| | | | |
|---|---|---|---|
| AT | E 135 427 | T1 | 9/1996 |
| AU | 606651 | | 2/1988 |
| AU | 653994 | | 3/1992 |
| CA | 757595 | | 4/1967 |
| CA | 1306411 | | 8/1992 |
| CA | 2010076 | | 7/2001 |
| CA | 2 064 300 | | 6/2002 |
| DE | 38 83 517 | T2 | 8/1987 |
| DE | 692 08 910 | T2 | 8/1996 |
| DE | 19734316 | A1 | 2/1999 |
| DK | EP 0506601 | T3 | 3/1996 |
| EP | 2 543 984 | | 4/1983 |
| EP | 0 210 304 | | 2/1987 |
| EP | 0 280 296 | | 8/1988 |
| EP | 0 351 079 | | 1/1990 |
| EP | 0 506 601 | | 3/1992 |
| EP | 0685 014 | B1 | 6/1997 |
| EP | 0 989 227 | A2 | 3/2000 |
| EP | 989227 | A2 | 3/2000 |
| FR | 1480860 | | 5/1967 |
| FR | 2210149 | | 7/1974 |
| FR | 2 659 094 | | 3/1990 |
| FR | 2659094 | A1 | 3/1990 |
| FR | 2784619 | A1 | 10/1998 |
| FR | 2784619 | | 4/2000 |
| GB | 1 447 049 | | 8/1976 |
| GB | 1 466 271 | | 3/1977 |
| GB | 2 065 031 | A | 6/1981 |
| GB | 2 126 951 | A | 4/1984 |
| GB | 2 214 869 | | 12/1991 |
| IE | 55104 | | 4/1984 |
| IT | 0 329 767 | | 8/1993 |
| IT | 24637BE/96 | | 6/1996 |
| JP | 52-155270 | | 12/1977 |
| JP | 54-163934 | | 12/1979 |
| JP | 56108565 | A | 1/1980 |
| JP | 55-147171 | | 11/1980 |
| JP | 356058824 | A | 5/1981 |
| JP | 56-108565 | | 8/1981 |
| JP | 56-141877 | | 11/1981 |
| JP | 359115885 | A | 4/1984 |
| JP | 60-171138 | | 9/1985 |
| JP | 60-236738 | | 11/1985 |
| JP | 64-61299 | | 8/1989 |
| JP | 2-25667 | | 6/1990 |
| JP | AP 491623 | | 7/1991 |
| JP | 5-201196 | | 8/1993 |
| JP | 02000084977 | A | 3/2000 |
| KR | 0220373 | | 6/1999 |
| NO | 306099 | | 9/1999 |
| SE | 0329767 | | 8/1988 |
| TW | 62640 | | 7/1993 |
| WO | WO 79/01146 | | 12/1979 |
| WO | WO 89/01829 | | 3/1989 |
| WO | WO 90/09289 | | 8/1990 |
| WO | WO 94/19530 | | 9/1994 |
| WO | WO 02/07959 | | 1/2002 |

| | | | |
|---|---|---|---|
| WO | WO 02/09925 | 2/2002 |
| WO | WO 02/058854 | 8/2002 |
| ZA | 88/6259 | 4/1990 |
| ZA | 92/2154 | 2/1993 |

OTHER PUBLICATIONS

Stahls'; *New Product Bulletin.*
Agion Technologies, LLC; *The Most Advanced Antimicrobial Silver Delivery System.*
Bayer Plastics Division Press Release, *Wheel Covers, Center Caps Become Revolving Art Forms with New Film Insert Molding Technology.*
Sonics & Materials, Inc., *Chart II Compatability of Thermoplastics.*
Lexan® In Mold Films; GE Structured Products; *A Guide fo Designing, forming and Molding with Screenprinted Lexan Films.*
Eastman; *Need? A Polyester Fiber with these attributes.*
Eastman PCT Polyester; *New Resins, New Services.*
Sear Catalog Spring/Summer 1978.
H. Wolf & Sons Inc.; *Flocking A Touch of Velour*; 1987.
JC Penny Catalog Fall/Winter 1991.
Casa Nostra Designs; *New York or the Big Apple*; 1997.
Shane, Kenr; *Advanced Molding Processes: Low Pressure Molding/Low-High Pressure Molding for Interior Trim*; 1997.
Time Magazine; *A Rug Fit for a Mouse*; Sep. 28, 1998.
USA Today; *New pads for computer mice now cutting a different rug*; Oct. 26, 1998.
Newsweek; *Rugs for Rodents*; Nov. 9, 1998.
Denver Business Journal: *When is a mouse pad really a rug?*; Nov. 27, 1998.
Wired; *Magic Carpet*; Nov. 1998.
Mouse Escalator; *The only resolution to all your PC mouse problems*; Jan. 27, 1999.
Changpad Trading Inc.; *Heat-Trans Pad*; Jan. 27, 1999.
Everglide; *Everglide Mousing Surface & trade*; Jan. 27, 1999.
Artpads; *Catalog*; Jan. 27, 1999.
Fake Fur Computer Accessories; *Catalog*; Jan. 27, 1999.
Lextra MouseRug; *Mouserug components*; Jan. 27, 1999.
Lextra MouseRug; *About the Product; About the MouseRug*; Jan. 27, 1999.
The Original PentaPad Specs; *The Original PentaPad*; Jan. 27, 1999.
Snyder, Merle R.; *Fabric Molding Shows Promise in Automotive*, 1999.
Takatori, Hiroyuki; *Dieprest In-mold Laminate Technology*, 1999.
Defosse, Matthew; *Systems Approach Gives Blow Molders Big Edge*, 2000.
Bostik USA; *Web & Powder Adhesives*; 2000.
Bostik USA; *Industrial Adhesives*; 2001.
Griffin, Patrick J.; Film Insert Molding; *New decorating methods eliminate oozing, hard-to-recycle pressure sensitive adhesives—freeing designers to incorporate 3-D contours, inegrated backlighting and matching surface textures in their designs,*, 2001.
Bemis; Sewfree; *Adhesive Film for Seamless Apparel Construction*; 2002.
Feature Story; *Spandex can now be made from Thermoplastic Polyurethane using a new breakthrough flexible Process*; Aug. 19, 2002.
Declaration of L. Brown Abrams Under 37 CFR § 1.132 for U.S. Appl. No. 09/735,721 dated Jan. 7, 2003.
Declaration of L. Brown Abrams Under 37 CFR § 1.132 for U.S. Appl. No. 09/621,830 dated Jan. 7, 2003.

* cited by examiner

SCREEN PRINTED RESIN FILM APPLIQUE OR TRANSFER MADE FROM LIQUID PLASTIC DISPERSION

CROSS REFERENCE TO RELATED APPLICATIONS

The present application claims priority under 35 U.S.C. §119(e) from U.S. Provisional Application Ser. No. 60/327,642, filed Oct. 5, 2001, entitled "Screen Printed Resin Film Applique Made from Liquid Plastic Dispersion", to Abrams, Ser. No. 60/344,862, filed Nov. 8, 2001, of the same title, to Abrams, and Ser. No. 60/332,647, filed Nov. 21, 2001, of the same title, to Abrams, each of which is incorporated herein by this reference.

FIELD OF THE INVENTION

This invention relates generally to resin films and specifically to sheet feed processed resin films.

BACKGROUND OF THE INVENTION

Appliqués and other design articles are widely used for a variety of decorative applications. Appliqués are generally design articles, such as patches, that are adhered or fastened to a substrate, such as a textile. Processes involving embroidery, screen-printing and flocking, conventionally manufacture Appliqués.

Embroidered appliqués are made by stitching designs with thread onto a fabric base material and then cutting the appliqué out of the material. Later stitching can be added to the edge of the material for a more finished-looking product. Examples of embroidered appliqués are disclosed in U.S. Pat. Nos. 3,657,060 and 3,816,211. Embroidered appliqués suffer from disadvantages including being expensive, labor intensive and slow to produce. Looms generally produce embroidered appliqués. It is also difficult or impossible to achieve a fine detail in the designs because of the limitations in the stitching process.

Screen-printed appliqués are made by screen-printing textile inks directly onto a textile and cutting out the appliqué. In the alternative, a pre-cut textile appliqué, with or without a stitched edge, can be screen-printed. Screen printed appliques are perceived as being an inferior product relative to an embroidered applique because they can lack three-dimensionality, rich texture, brilliant appearance, and wash-fastness.

Flocked appliqués are made by screen printing a flocking adhesive onto a substrate, applying flock fibers to the adhesive by vibration, gravity or electrostatic discharges, drying the flocked adhesive, vacuum cleaning excess flock fibers from the flocked adhesive, cutting the resulting appliqué into a desired shape, and optionally stitching the edge for a finished look.

There are two methods of applying flock to a substrate. The first method is referred to as direct flocking, and the second method is referred to as flock transfers.

In direct flocking, the flock is applied directly to the substrate that forms the finished product. Usually wallpaper, carpets and decorative elements of garments are produced in this manner. An example of direct flocking is found in U.S. Pat. No. 3,793,050. This particular direct flocking method allows the use of different color or size of flock in the same design surface to be flocked. Each color of flock is passed through a screen that restricts the color to the desired part of an adhesive layer. A multicolor flock design is thus obtained on the surface of the substrate being flocked.

Multicolor direct flocking can have a number of disadvantages. It is an exacting procedure with many variables to be controlled requiring specialized flocking equipment and an environment that is controlled for relative humidity. During startup, many reject-quality articles may result as the process variables are adjusted by trial and error until the desired result is found. Further, if the article to be decorated has an uneven surface like many textiles, then density of the flock, control, speed and the quality of the finished design, i.e., sharpness of lines separating colors, vivid images, etc., can be adversely affected.

In transfers, the flocked design is bonded in reverse to a release sheet by means of a temporary release adhesive coating. The flock can be colored with different color inks and coated with a binding layer and hot melt adhesive in a desired reverse image. The transfers are applied to articles using heat and/or pressure. The release sheet is then peeled away leaving a finished decorative design. Examples of transfers are described in U.S. Pat. Nos. 4,810,549; 5,207,851; 5,047,103; 5,346,746; 5,597,637; 5,858,156; 6,010,764; 6,083,332; and 6,110,560; in copending U.S. patent application Ser. Nos. 09/548,839; 09/621,830; 09/629,746; and 09/735,721; and in EP 0 685 014.

Various techniques have been developed to produce flocked transfers. The process of U.S. Pat. No. 4,810,549, for example, forms a design by screen printing a transfer release adhesive onto a primary carrier, screen printing successive colors of flock onto the transfer release adhesive in desired patterns, screen printing the protruding tips of the flock with a water-based acrylic binder (40–60% water), applying a nylon polyester hot melt adhesive to the acrylic binder, and heating the design to cross link the binder and the adhesive. The process of EPO 685,014 first applies a base layer of plastic sheet material to the entire surface of the primary carrier, second selectively applies an adhesive to regions of the base layer through an image screen, third applies flock fibers to the base layer through the image screen, and finally high frequency welds the base layer to the desired substrate.

Flock transfers and the conventional methods for manufacturing them can have a number of disadvantages. First, the transfers are relatively expensive to manufacture and/or difficult to manufacture in high volumes. Second, the manufacturing methods are relatively complex and require a substantial capital investment. Third, the transfers require the release sheet to remain in place until after cooling and solidification of the adhesive and application to the substrate due to the poor strength of the permanent adhesive layer. Fourth, the manufacturing methods require undesired, flocked areas (like the center of the letter "O") to be eliminated by being cut and/or picked out. Fifth, the use of a thermoplastic (hot melt) adhesive, such as polyester, leads to problems with higher operating costs, greater unit production times, and other problems associated with drying, removing excess material, and curing adhesives. Sixth, the process of EPO 685,014 requires (in addition to the primary carrier) a plastic base layer to support the resin film. This process is undesirable in that two separate layers, namely the base layer and adhesive layer, are deposited rather than the single layer.

SUMMARY OF THE INVENTION

The process of the present invention generally manufactures transfers such as appliqués by applying, particularly by screen printing techniques, one or more adhesives in one or more overlapping, desired patterns on a release adhesive located on a primary carrier. A desired decorative medium is applied to either the primary carrier before adhesive application or to the applied adhesive. In a preferred embodiment, the adhesive is in the form of a resin dispersion.

As will be appreciated, an "adhesive" is any substance, whether inorganic or organic, natural or synthetic, that is capable of bonding other substances together, typically by surface attachment. Examples of suitable adhesives include high temperature adhesives, such as polybenzimidazoles and silica-boric acid mixtures or cements, hot-melt adhesives, thermoset adhesives, and polyurethane. Particularly preferred adhesives are in the form of resin dispersions such as plastisol. "Hot-melt adhesives" generally refer to a solid, thermoplastic material that forms a melt bond upon heating and subsequent cooling, "thermoset adhesives" generally refer to a high polymer that solidifies or "sets" irreversibly when heated, and "resin dispersions" generally refer to a solid phase of particles of one or more resins dispersed in a continuous, typically liquid, phase (e.g., a plasticizer). The resin dispersion gels and/or fuses when heated. The resin dispersion can be water-based or solvent-based and in the form of a liquid or paste or in the form of a solid mixture of a resin and plasticizer. The "gelled phase" refers to a semi-solid phase, such as a viscous jelly-like product, or solid phase of an organic material that has little or no cross-linking while the "fused" stage refers to a solid phase in which at least most, if not all, of the polymers in the resin particles are cross-linked. Plastisol is a type of resin dispersion and is a dispersion of one or more resins in a plasticizer. Plastisol is in the form of a liquid or paste. The resin component preferably is an organic, crosslinkable polymer or oligomer that, when converted to its final state for use, is crosslinked, and, after being crosslinked, is high frequency weldable. Preferred resins include poly (ethylene vinyl acetate), poly (vinyl chloride), polyamides and polyurethanes, and more preferably are a polymer or oligomer of a vinyl monomer, such as polyvinyl chloride. The resin dispersion can include fine particles of polymers or copolymers, as well as one or more of plasticizer(s), viscosity reducer(s), viscosity increaser(s), stabilizer(s), filler(s), thickener(s), curing agent(s) (such as an isocyanate), pigment(s), etc. Typically, the plasticizer is the continuous phase in the resin dispersion and acts as a vehicle for the dispersed resin and other additives. The resin acts as a binder for all of the other additives. The pigment, if any, determines the color and opacity of the resin film. The filler increases the viscosity and/or thickness of the resin dispersion film, as applied, proportionally with the concentration of the filler. The stabilizer, used when pigment is added, prevents discoloration of the resin film. The viscosity reducer effectively reduces the viscosity of the resin dispersion, which can be important in screen printing deposition methods. The viscosity increaser increases the viscosity of the resin dispersion. Preferably, at least some of the volume of the continuous liquid phase comprises one or more liquid plasticizers.

The primary carrier (and secondary carrier if employed) can be any suitable sacrificial or temporary substrate coated with a temporary release adhesive. The primary carrier is removed from the design before, during, or after permanent attachment of the design to a desired substrate.

Besides screen printing, any other suitable technique for applying a liquid adhesive to the carrier can be employed. For example, suitable adhesive deposition techniques include other coating or imaging techniques besides screen printing, such as those using a coating mechanism, design templates, imaged dies, etc., to deposit a specific image or full coating on a primary carrier (e.g., a base sheet).

The decorative medium can be any suitable design medium or mixtures of different types of design media. Examples include flocking such as polyamide fibers), coatings, colors such as pigments or dyes, beads, metallic flakes, glitters, reflective materials, inks, wood particles, and glass. In a preferred configuration, the decorative media includes multiple, different colors of flock fibers.

Various transfer configurations or designs are contemplated by the present invention.

In one embodiment, for example, the transfer comprises:

(a) a primary carrier;

(b) a (temporary) release adhesive in contact with the primary carrier;

(c) a gelled and/or fused resin dispersion in contact with the release adhesive; and (d) a decorative medium in contact with the resin dispersion.

As will be appreciated, the bonding force between the resin dispersion and the decorative medium is greater than the bonding force between the release adhesive and the resin dispersion to permit the carrier to be removed and so the finished product is durable.

The decorative medium (which is typically embedded in (or extends into) the adhesive) is typically contacted with the ungelled and unfused resin dispersion and/or with the partially gelled and unfused resin dispersion and the resin dispersion then heated to a sufficient temperature to pass through both the gel and fusing stages. While not wishing to be bound by any theory, it is believed that the resin dispersion, upon application of heat and/or pressure, will melt, penetrate and surround the design medium, and gel or solidify or cure to form a resin film. The resin film (or solidified resin dispersion) and attached design medium can be removed from the primary carrier at any time to provide a free-form image of relatively high strength.

A secondary (or formable) carrier can be used to facilitate removal of undesired portions of the design and/or maintain desired orientations of various disconnected parts of the design. The secondary carrier is typically bonded to the exposed surface of the decorative medium by a second (temporary) release adhesive or coating. The bonding force between the release adhesive and the primary carrier is less than the bonding force between the second release adhesive and the secondary carrier to permit the primary carrier to be removed without partial or complete removal of the secondary carrier.

In a second embodiment, the transfer comprises:

(a) a primary carrier;

(b) a release adhesive or coating in contact with the primary carrier;

(c) an activatable adhesive in contact with the release adhesive;

(d) a gelled and/or fused resin dispersion (other than the activatable adhesive) in contact with the activatable adhesive; and (e) a decorative medium in contact with the resin dispersion.

The activatable adhesive can be any suitable permanent adhesive, such as a hot-melt adhesive, a thermoset adhesive, a thermoplastic adhesive, and the like.

Additional decorative media can be used in addition to the decorative medium noted above to provide aesthetically pleasing effects. For example, a second activatable adhesive can be applied between the decorative medium noted above and the second decorative medium to bond the differing media layers together. Alternatively, the second decorative medium can be contacted with the decorative medium and the second activatable adhesive applied to the exposed surface of the second decorative medium.

As in the prior embodiment, a secondary carrier and secondary release adhesive can be bonded to the exposed surface of the decorative medium in this embodiment.

In yet another alternative embodiment, the transfer comprises:

(a) a primary (or formable) carrier;

(b) a release adhesive or coating in contact with the primary carrier;

(c) a decorative medium in contact with the release adhesive or coating; and (d) a gelled and/or fused resin dispersion in contact with the decorative medium.

Unlike the prior embodiments in which the adhesives and decorative media are commonly applied in the shape of a predetermined design pattern, the release adhesive, decorative medium, and/or resin dispersion in this embodiment are applied in a reverse shape of the predetermined design pattern.

The various processes and transfers can have a number of advantages. First, multicolored free-form images or designs can be manufactured inexpensively and in high volumes. Second, the process can be relatively simple and require at most a modest capital investment. Third, the precision of screen printing permits adhesive to be applied such that portions of the design are easily omitted so as to be free from cutting or trimming operations. The ability to create voids in the finished design where desired not only eliminates subsequent cutting and/or picking out of material to be eliminated (like the center of the letter "O") but also saves material and money. This is especially desirable where the design has multiple disconnected parts. This ability also permits novel design configurations, such as designs where the resin film or substrate is exposed as part of the overall design. Alternatively, part of the resin dispersion can be left exposed and the dispersion then sprinkled with or dipped into a design medium to fill the exposed area of the resin dispersion. The exposed area can thus be used for inclusion of different types of design medium materials (like textiles, holograms, glitter particles, beads, etc.) incorporated into the finished product to create interesting, mixed media looks. Fourth, an adhesive powder is not required to be placed on the side of the design to be bonded to the substrate. Fifth, the free-form image produced by the process can be much softer and have richer coloration than free-form images produced by other processes, such as those using inks for coloration. The amenability of the process to a multicolor direct flocking process permits the creation of multicolor flocked images. Sixth, the free-form image can have a sufficient tensile strength for handling independently of any carrier or substrate. Seventh, the process uses a resin dispersion, rather than a resin film plus a thermoplastic (hot melt) adhesive, such as polyester, during screen printing. This eliminates cost, time, and many problems associated with drying, removing excess material, and curing adhesives. A resin film will be a more homogenized and less expensive finished product. Eighth, the process does not require (in addition to the primary carrier) a base layer to support the resin film. Various embodiments of the present invention apply (such as by screen printing techniques) the resin dispersion directly to (and form the resin film from the resin dispersion in) only one or more discrete portions of the primary carrier that are typically in the pattern of or the reverse pattern of the design, depending upon the process configuration. When the resin dispersion is applied and fused with high frequency energy or welded, there is preferably no polyester, plastic, or other type of polymeric film (such as a poly(vinyl chloride) film) already in place on the carrier. Rather, the resin dispersion is applied directly to the release adhesive on the carrier. Ninth, the fused resin formed from the resin dispersion is weldable to substrates, such as textiles, using high frequency energy.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
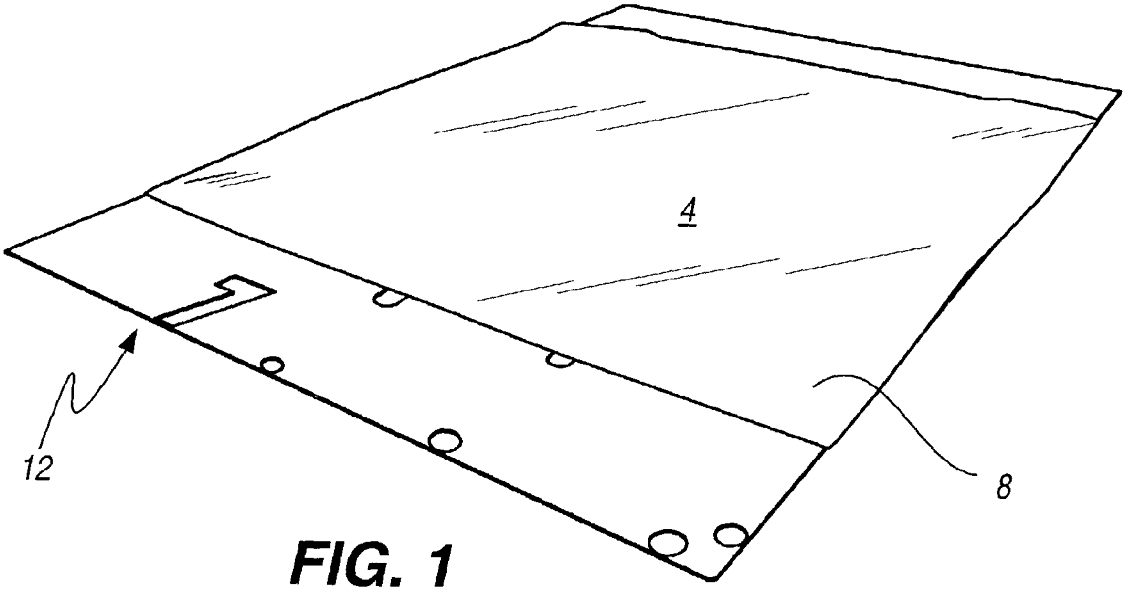
FIGS. 1–8 depict embodiments of a process for manufacturing resin films and applying resin films to a desired surface.
Figure 3:
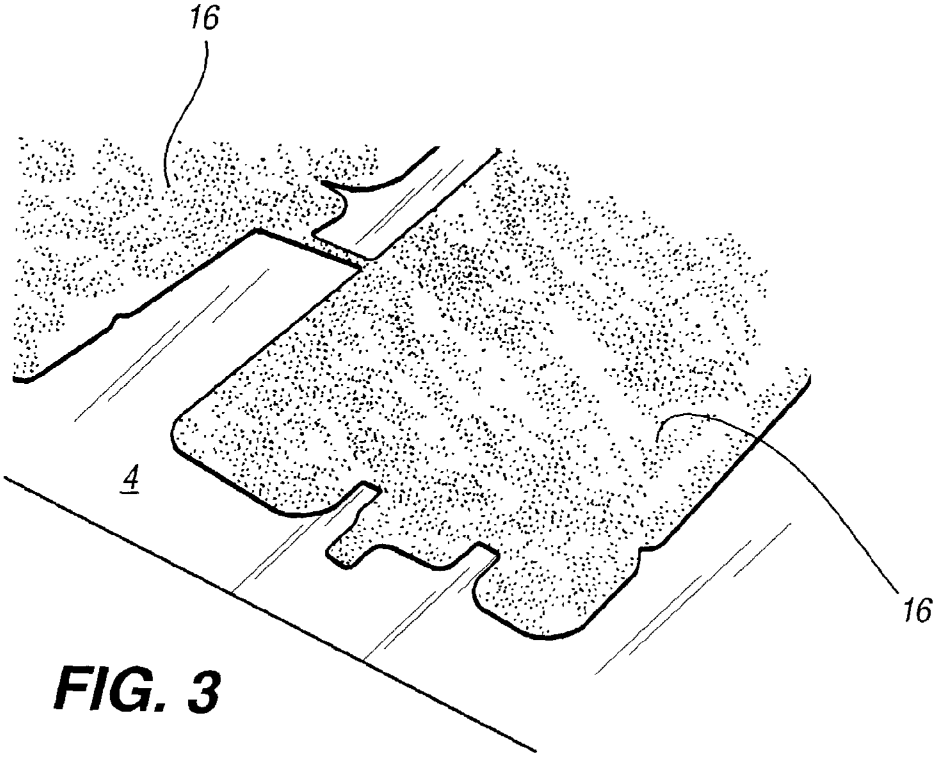
Figure 2:
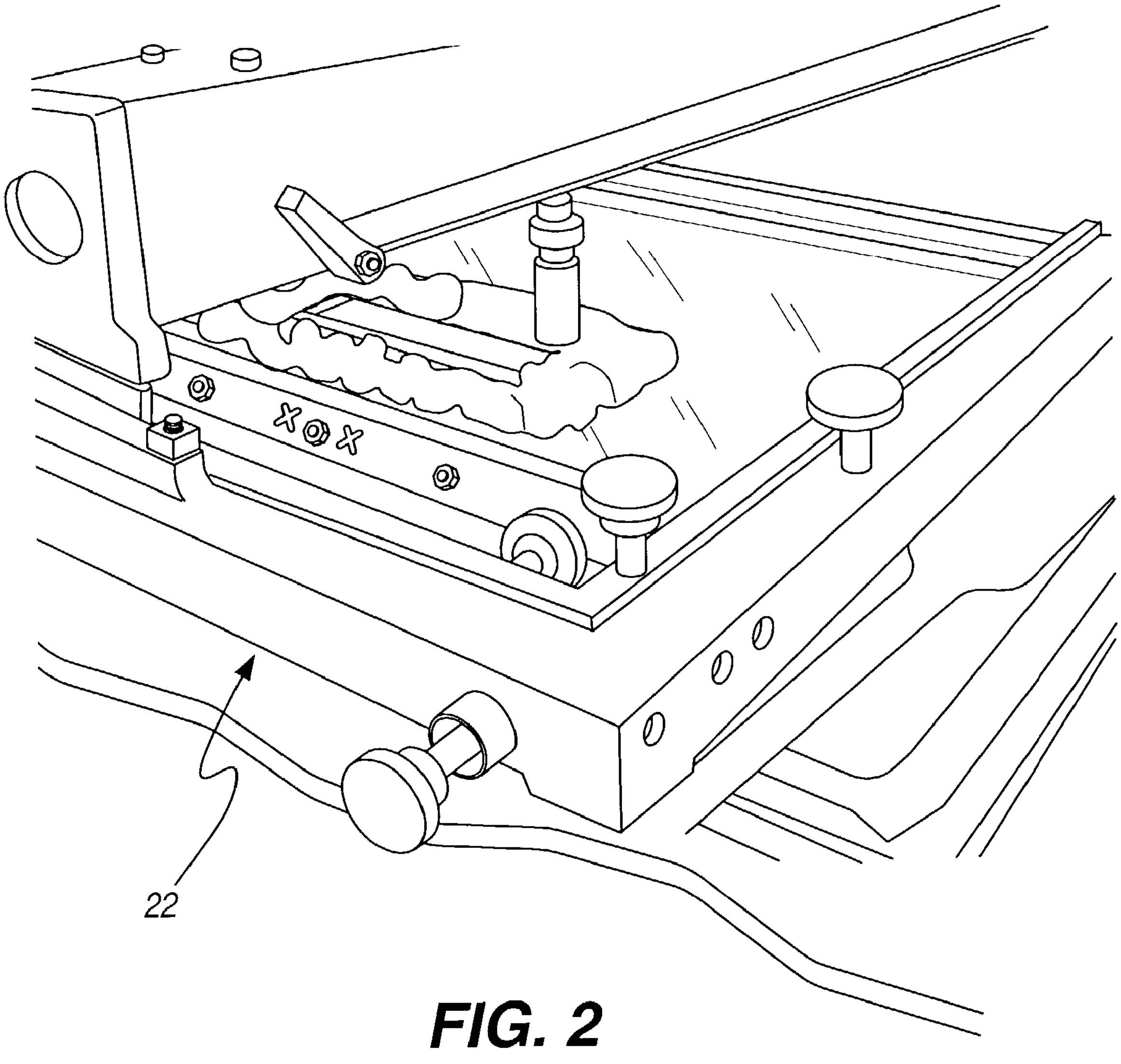

The manufacturing process of the present invention will be described with reference to FIGS. 1–14. Referring to FIGS. 1 and 9, a primary carrier 4 having a release coating or temporary release adhesive 6 on at least the upper surface 8 is placed onto a screen printing press 12 with the release adhesive facing up.

The carrier 4 can be any suitable transfer carrier, such as dimensionally stable paper, processed paper, plastic film, resin sheets, and metal foils. Depending on the desired effect and the sheet materials employed, the carrier can be transparent, translucent, or opaque, but is typically transparent. Typically (but not always), the primary carrier is a discontinuous sheet as opposed to a continuous sheet on a running web line.

The release adhesive can be any adhesive that has a relatively low bonding strength with the resin film (as is commonly known for stickers or pressure-sensitive decal media). The release adhesive may be applied in the form of a solution or emulsion, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, or compositions containing two or more of these ingredients. Preferably, the release adhesive has a sufficiently low surface energy to enable even coating of the resin dispersion (applied in the next step) on the release adhesive.

The release adhesive may be applied on the carrier in the perimeter shape of the desired design or without regard to the overall design desired. The release adhesive may be applied by any suitable technique such as, for example, by applying the release adhesive with rollers or spraying the release adhesive.

Referring to FIGS. 2 to 9, a (liquid, semi-liquid, or semi-solid) resin dispersion 16 is screen printed (through an image screen) using a screen printer 22 onto the upper surface 20 of the primary carrier 4 using known techniques. As can be seen from FIG. 3, the resin dispersion 16 is typically applied in the perimeter shape of the desired shape or design (in plan view such as the shape of the NIKE™ logo in FIG. 4) to avoid cutting or trimming of the resin dispersion in later stages of the manufacturing process. Alternatively, the resin dispersion can be deposited on the carrier 4 by other techniques, such as spraying, extruding, and/or application through an image screen or template, that place the resin dispersion into distinct (discontinuous) image areas (as opposed to an overall (continuous) coating) onto the primary carrier.

The resin dispersion can be any resin dispersion that will produce a resin film after fusing having desired characteristics. Considerations in formulating resin dispersions include screen printability, desired softness, desired thickness, color or other special effects (inclusion of glitter particles for example), acceptability and permanent adhesion of flock fibers, wash fastness, tensile strength, ability to be formed, welded and cut with a metal die in the high frequency field, and satisfactory adhesion when welded onto a desired substrate. To provide a high tensile strength, the resin dispersion typically includes at least about 0.1 wt. %, more typically at least about 0.5 wt. %, and even more typically from about 0.5 to about 2.5 wt. % of a curing agent.

Because the resin film (after fused stage) is preferably self-supporting after removal from the primary carrier and able to withstand handling by customers, production personnel, washing/wearing, and/or machinery, the resin film (after fused stage) typically requires a minimum tensile strength. The resin dispersion should be able to form a resin film that is reactive to high frequency welding. As will be appreciated, the gelled and fused resin dispersion or resin film could be applied to a substrate by sewing, stitching or other mechanical application. Typically, the resin film will have a tensile strength similar to that of commonly available calendared, cast, and/or extruded films and greater than tensile strength of PLASTISOL™ transfer ink films. Preferably, the tensile strength of the resin film is at least about 500 psi and more preferably ranges from about 600 to about 1,000 psi.

To realize this tensile strength, the thickness $T_R$ of the resin dispersion 16 (when applied) preferably is at least about 6 mil, more preferably ranges from about 8 to about 25 mil, and even more preferably from about 8 to about 12 mil, and the thickness of the (gelled and fused) resin film preferably is at least about 2.5 mil, more preferably at least about 4 mil, and even more preferably ranges from about 5 to about 20 mil.

The resin dispersion should also have a sufficient density (or average molecular weight) to be (highly) reactive to high frequency welding. Preferably, the viscosity of the resin dispersion ranges from about 20,000 to about 5,000,000 cp at 25° C.

Preferred resins in suitable resin dispersions include vinyls, such as plastisol (which comprises a polyvinyl chloride resin), urethanes, nylons, acrylics, acetates, and/or olefins. “Vinyls” refer to a compound including the vinyl grouping ($CH_2$---CH--) or a derivative thereof; “urethanes” to a compound including the grouping $CO(NH_2)OC_2H_5$ or a derivative thereof; nylons to a compound having the grouping —CONH or a derivative thereof, acrylics to a compound including the acrylonitrile grouping or a derivative thereof, acetates to an ester of acetic acid where the substitution is by a radical; olefins to a class of unsaturated aliphatic hydrocarbons having one or more double bonds; amides to a class of compounds comprising an acyl group (—$CONH_2$) typically attached to an organic group “R”, where R can include hydrogen, an alkyl group, and an aryl group. More preferably, at least most of the resin is a vinyl polymer or oligomer, a urethane polymer or oligomer, an acetate polymer or oligomer, an amide polymer or oligomer, and mixtures thereof. Even more preferably, the resin is a poly (vinyl chloride), a polyurethane, a poly (ethylene vinyl acetate), a polyamide, and mixtures thereof As noted, the resins in the resin dispersion typically include polymers and/or oligomers of the foregoing compounds. Preferably, the resin dispersion comprises at least about 25 wt. %, more preferably at least about 26 wt. %, and even more preferably from about 25 to about 35 wt. % of the resin. The remainder of the resin dispersion is primarily composed of the plasticizer (which typically is from about 30 to about 40 wt. % of the resin dispersion). Typically, the resin dispersion includes no more than about 45 wt. % of the other additives noted above. A preferred resin dispersion is Rutland Screen Printing Plastisol™ manufactured by Rutland Plastic Technologies, Inc.

When the resin dispersion includes polyvinyl chloride as the resin component, the resin dispersion can be prepared by hot mixing the resin with plasticizers and, typically small proportions of, stabilizers to provide a resin film that is flexible and pliable. Pigment(s) can be included to provide resin films in a wide range of colors, as well as crystal clear. As will be appreciated, a flexible and pliable resin film is preferred over a rigid resin film as a flexible and pliable film conforms readily to undulations in the surface of the substrate to which the resin film is later applied, such as using dielectric (capacitance) welding or high frequency (HF) welding (e.g., plain welding or tear-seal welding). As will be appreciated radio frequency welding is the process of bonding materials together by applying radio frequency energy to the area to be joined. The method utilizes heat generated in poor electrical conductors, such as the resin film and substrate, when the materials are placed in varying high-frequency electromagnetic fields. The heat results from electrical losses that occur in the resin film, which is located or sandwiched between two metal plates or bars (electrodes). The sandwich forms a type of capacitor connected to a radio-frequency oscillator. The metal plates or bars (electrodes) also serve to hold the resin film and substrate together during heating and cooling. The electrical energy lost in the resin film and substrate is actually absorbed by them, causing their respective molecules to vibrate, thereby raising its kinetic energy or thermal energy. Unlike induction heating (i.e., pre-heated bars melting work pieces together), in which non-uniform heating may occur, dielectric heating makes it possible to heat an object evenly throughout its volume, thereby making a uniform weld. RF welding relies on certain properties of the material in the parts to be welded, namely its geometry and dipole moment, to cause heat generation in the rapidly alternating electromagnetic field. The electromagnetic energy frequency range used for RF or dielectric welding is the portion of the electromagnetic spectrum between the audio-frequency portion and the infrared portion and typically ranges from about 10 $kH_z$ to about 100,000 $MH_z$ with about 27.12 $MH_z$ being a typical frequency for RF welding. Thermoplastics that have weak dipoles and cannot be welded by this process include polyolefins such as polyethylene, polypropylene, and PTFE.

Figure 4:
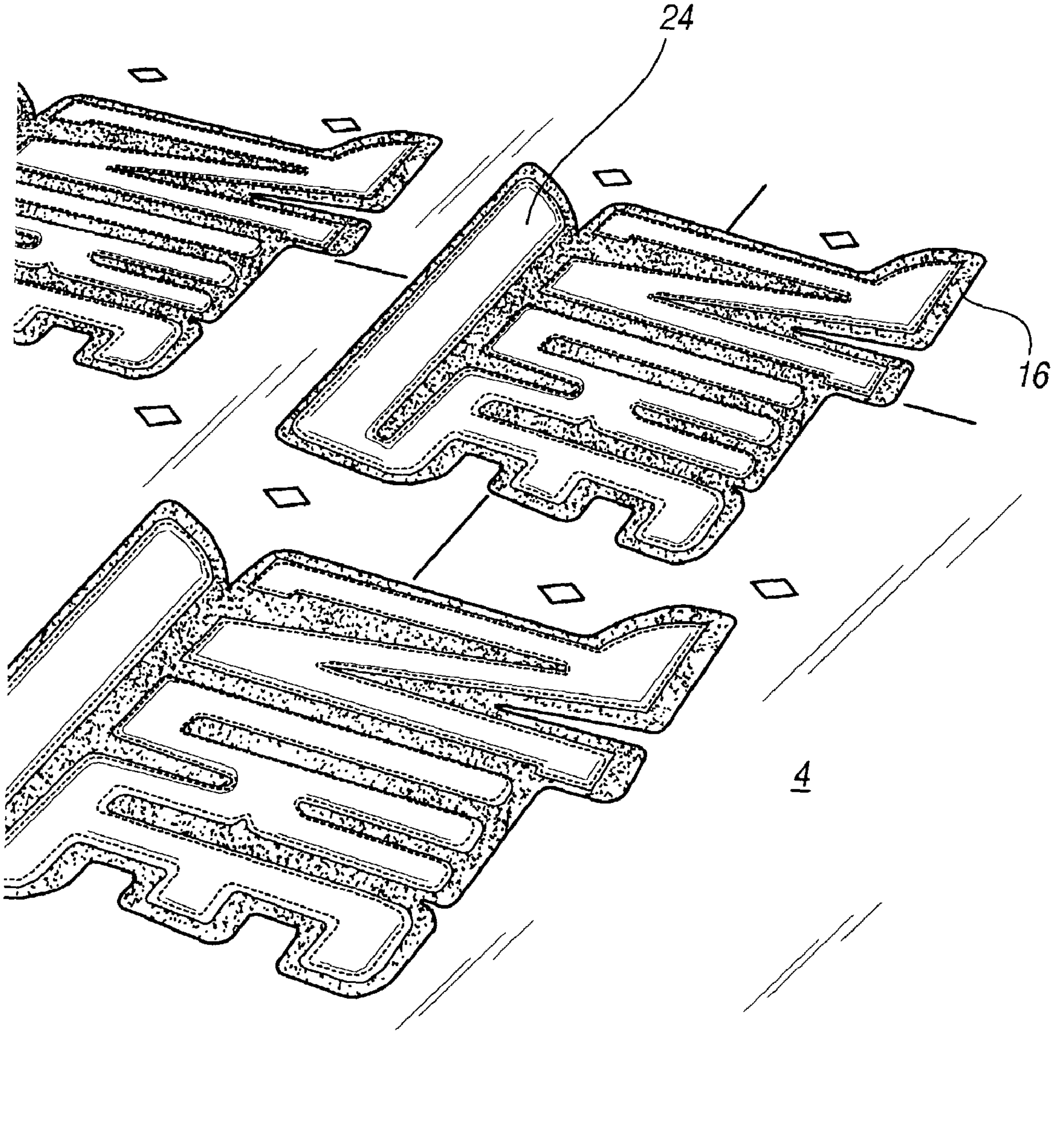
Figure 10:
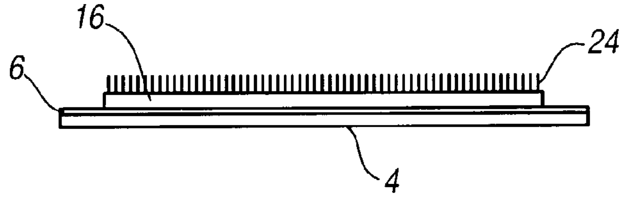
FIG. 10 is a side view of the primary carrier and resin dispersion after flocking as shown in FIG. 4.

Referring to FIGS. 4 and 10, one or more design or decorative medium/media 24 is applied to the ungelled and unfused resin dispersion (which is wet and tacky) in desired areas by known techniques. The decorative medium is selected so as to be stable at the temperature of heating in the next step. The decorative medium, for example, can be flock fibers, coatings, colors such as pigments or dyes, beads, metallic flakes, glitter, reflective material, inks, etc. The decorative medium/media can be applied by any desirable technique, such as spraying, gravity, sprinkling, vibrating, and electrostatic techniques.

In one configuration, the decorative medium is flock and applied by multicolor direct electrostatic fiber coated heat transfer printing such as described in U.S. Pat. Nos. 4,810,549; 5,207,851; 5,047,103; 5,346,746; 5,597,637; 5,858,156; 6,010,764; 6,083,332; and 6,110,560 and in copending U.S. patent application Ser. Nos. 09/548,839; 09/621,830; 09/629,746; and 09/735,721, all of which are incorporated herein by this reference. The flock can be rayon, and other types of conductive material such as nylon, polyamide, polyester, and similar synthetic fibers, with nylon being preferred. In this process, the decorative medium is electrostatically charged and inserted into the resin dispersion (which is given an electric charge opposite to that of the flock fibers). The technique causes the individual flock fibers to be oriented transverse to and typically perpendicular to the planes of the carrier, release adhesive film, and resin dispersion film. This alignment forms a desirable dense pile finish. In these processes, different colors of flock (or fibers) are typically applied through separate screens. The screens have a distribution of openings consistent with the desired locations of the respective color of flock fibers. Other techniques, which can mount the medium in a desired position and in such a way as to hold or entrap the medium after curing, can also be employed. Examples of such techniques include vibration, gravity, and spraying.

Figure 5:
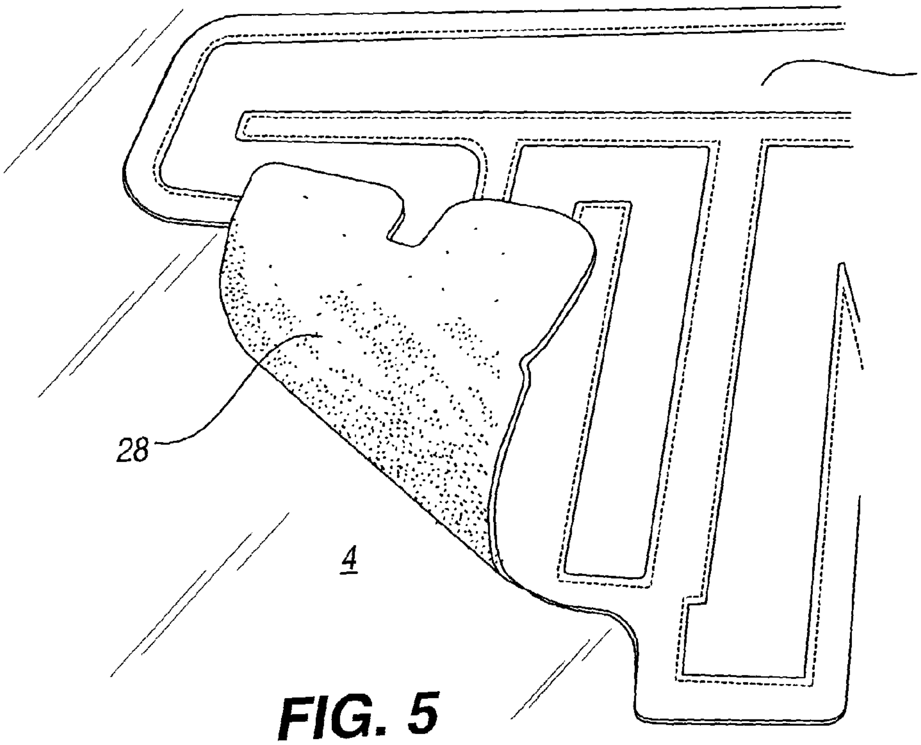
Figure 11:
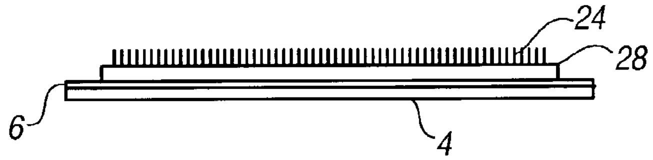
FIG. 11 is a side view of the primary carrier and flocked resin film after fusing.

Referring to FIGS. 5 and 11, the resin dispersion and attached decorative medium/media are heated or cured, such as in an infrared dryer, to a temperature at or above the gel temperature and the fused stage temperature of the resin dispersion for a time sufficient for the resin dispersion to pass through both the gel stage (in which the resin dispersion partially solidifies or begins to solidify) and fusing stage (in which the resin dispersion fully solidifies) and form fused resin film 28.

As will be appreciated, the gel temperature or gel point is the temperature at which the resin dispersion starts to become a solid. The gel point of a resin dispersion determines how fast the resin dispersion will flash (or the liquid component(s) vaporize) at a given thickness. A thinner film will flash more quickly than a thicker film as there is less material to dry.

The fused stage temperature of a resin dispersion is that temperature necessary to completely fuse, at least substantially, the resin dispersion. This temperature is typically dictated by the resins and plasticizers in the formulation and is typically (320)(dwell or residence time)° F./160° C. Typically, the heating temperature is at least about 340° F. and more typically ranges from about 320° F. to about 370° F. The residence time is typically at least about 0.5 minute and more typically ranges from about 1 to about 3 minutes.

As desired, the resin film 28 can be vacuum cleaned to remove residual decorative media.

Figure 12:
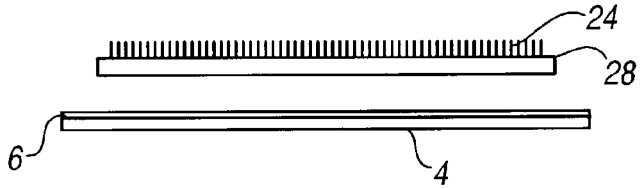
FIG. 12 is a side view of the flocked resin film after removal from the primary carrier as shown in FIG. 5.

Referring to FIGS. 5 and 12, the resin film, after fused stage or solidification, is peeled from the primary carrier 4. The resin film can be sold as a separate product for later application to a desired substrate. Alternatively, the resin film can be applied to the desired substrate during the manufacturing process. The substrate can be any compatible material, whether woven, nonwoven, or knit and of any compatible composition, such as plastic film.

In either event, the application of the resin film to a desired substrate will now be described.

Figure 6:
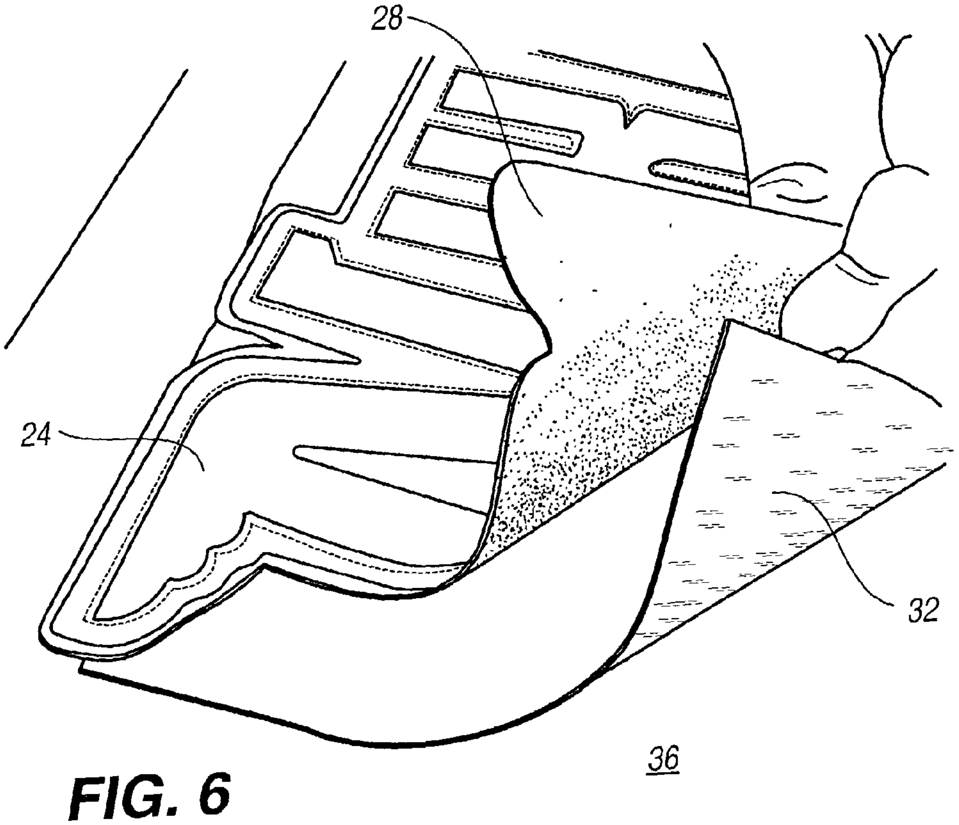
Figure 13:
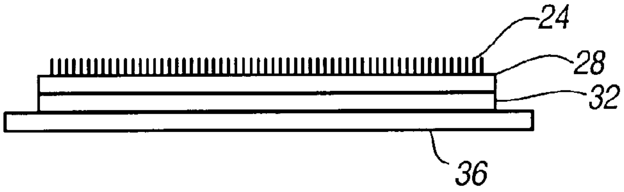
FIG. 13 is a side view of the flocked resin film being applied to a substrate as shown in FIG. 6.
Figure 14:
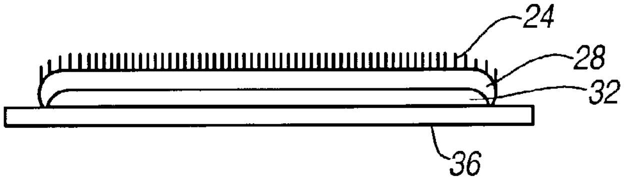
FIG. 14 is a side view of the flocked resin film after being welded to the substrate as shown in FIG. 7.

Referring to FIGS. 6 and 13, foam backing 32 is placed on the substrate 36 and the resin film 28 (with attached decorative media) is placed on top of the foam backing 32. The foam backing dimensionalizes or pads the resin film. The resin film and foam backing are then bonded to the substrate by any suitable bonding technique, such as thermal, mechanical, or molecular adhesion. Preferably, the bonding is performed by high frequency welding with a metal (such as magnesium, brass, or copper) die. Alternatively, the foam backing 32 can be formed from the resin film itself by incorporating one or more commonly used blowing agents into the resin dispersion or the resin film. When the resin film is fused, the blowing agent will produce a gas, which will cause the resin film to form an open and/or closed cell foam structure. Alternatively, the foam backing or blowing agent can be entirely omitted. In this configuration, the resin film is not dimensionalized on the substrate but is directly applied to the substrate.

Figure 7:
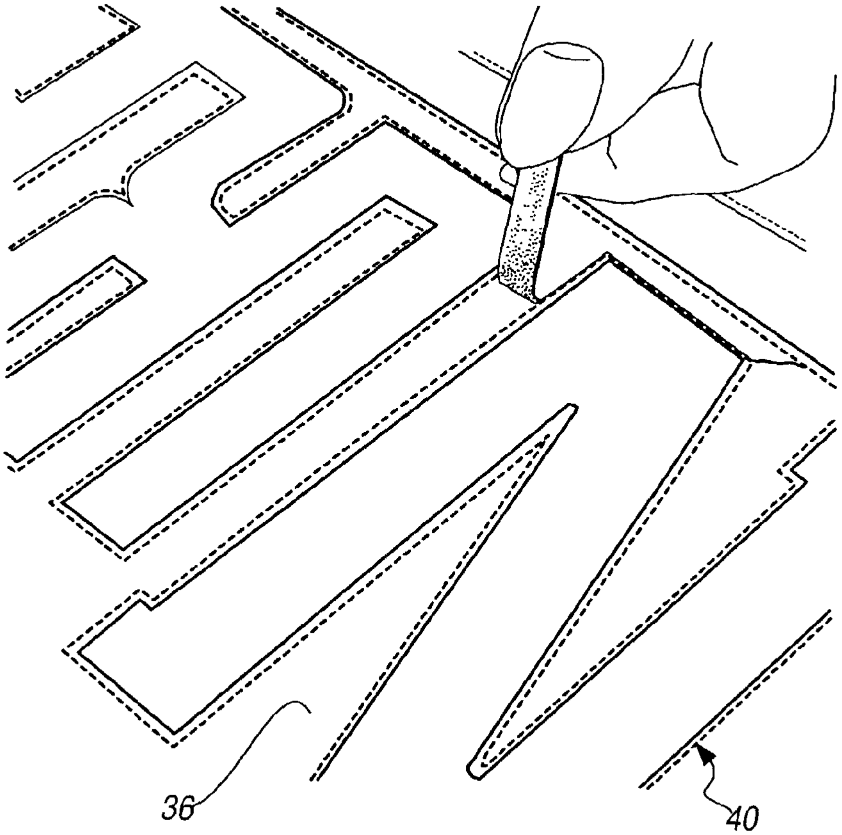
Figure 8:
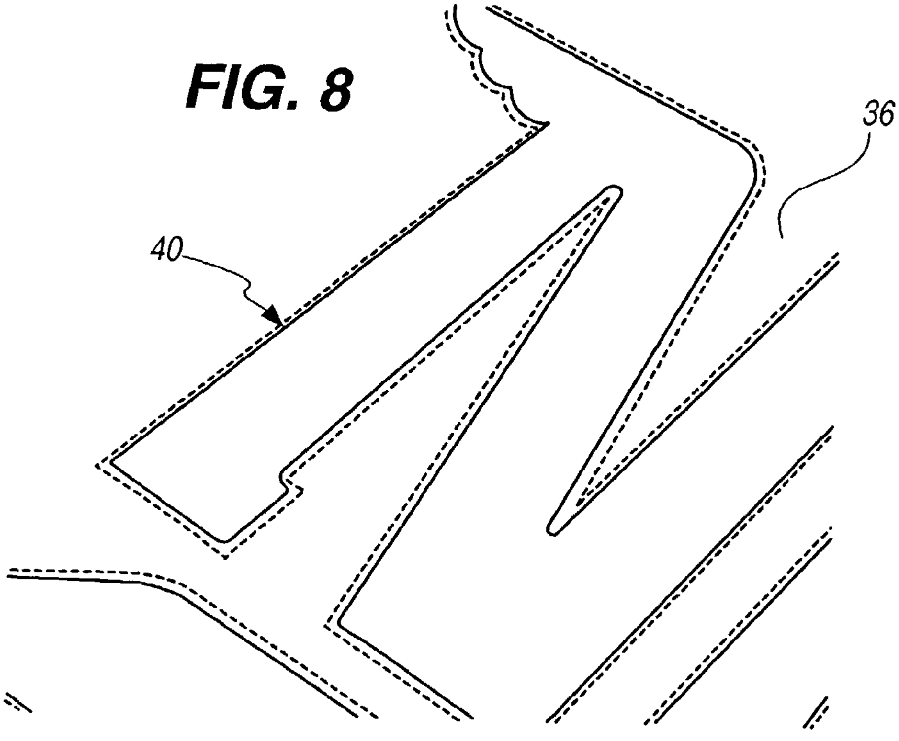
Figure 9:
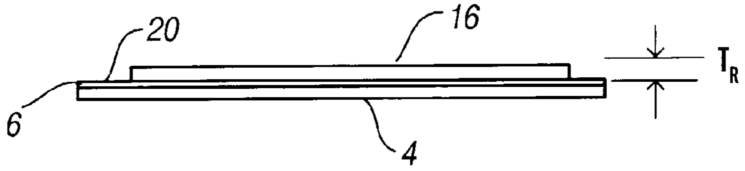
FIG. 9 is a side view of the primary carrier and resin dispersion as formed in FIG. 3.

Referring now to FIGS. 7–8 and 13, after the resin film is bonded to the substrate any portion of the resin film that is undesirable is stripped or cut from the substrate, leaving the finished and dimensionalized design 40 on the substrate. The design is further depicted in FIGS. 13–14. As will be appreciated, adhering the perimeter of the design segments to the substrate and not adhering the portions of the resin film that must be stripped from the substrate can simplify the stripping operation. A welding die readily accomplishes this selective bonding operation.

A number of variations and modifications of the invention can be used in addition to the variations discussed above. It would be possible to provide for some features of the invention without providing others.

Figure 15:
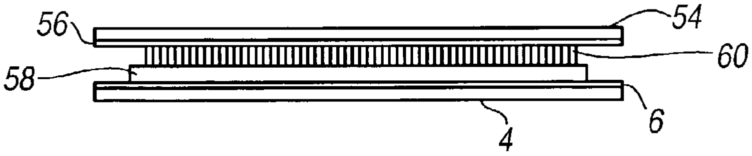
FIG. 15 is a side view of an alternative process embodiment.
Figure 16:
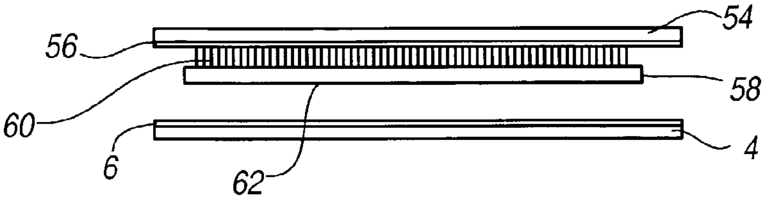
FIG. 16 is a side view of another alternative process embodiment.

For example, an alternative embodiment shown in FIGS. 15 and 16, the resin dispersion (after application of the decorative medium 60 before fused stage) or the resin film (after fused stage) 58 is bonded to a secondary carrier 54 having a secondary release adhesive 56 to facilitate later application of the resin film 58 to the substrate. As can be seen from FIG. 15 the primary carrier 4 and secondary carrier 54 are located on opposing sides of the resin dispersion/resin film 58 and decorative media 60. The secondary carrier 54 is bonded by any suitable technique, such as heat tacking or sealing, to the front face of the design.

The secondary release adhesive 56 is selected such that the bond strength of the secondary release adhesive exceeds the bond strength of the release adhesive 6. Thus, the bonding force of the secondary carrier (or secondary release adhesive) to the media 60 is greater than the bonding force of the primary carrier (or release adhesive 6) to the (gelled or fused) resin dispersion/resin film 58. Accordingly as shown in FIG. 16, the primary carrier 4 can be removed from the resin film 58 without removing the resin film 58 and media 60 or portions thereof from the secondary carrier 54. The bond strength of the secondary release adhesive 60, however, is less than that of the gelled and fused resin film 58 and is weak enough so that the secondary carrier 54 may be readily removed from the decorative media 60 after the resin film 58 is bonded or otherwise attached to a substrate (not shown). Thus, the bond strength of the secondary release adhesive 56 is also less than the bond or attachment strength of the resin film 62 to the substrate. The secondary adhesive 56 can be activatable after application to the decorative media, such as by pressure, heat, and/or light. The secondary adhesive 56 can be, for example, a thermoplastic adhesive, a pressure sensitive adhesive, latex, a thermoset adhesive, wax, and mixtures thereof. This secondary adhesive 56 is activated thermally to bond temporarily the secondary carrier 54 to the design media 60.

The secondary adhesive 56 can be applied in the perimeter shape of the selected design referred to previously or applied without regard to the perimeter shape. The secondary adhesive 56 can initially be applied directly to the media or secondary carrier 54, as desired.

This embodiment is particularly useful where the design has a number of discrete or disconnected parts or segments. For example, the phrase NIKE™ has four disconnected parts, namely the letters "N", "I", "K", and "E". The secondary carrier 54 maintains the desired spacing and orientation of the various letters after the carrier sheet 4 is removed from the resin film 58. Thus, the surface 62 to be bonded to the substrate may be exposed without misorientation/misalignment of the differing parts of the design.

Figure 17A:
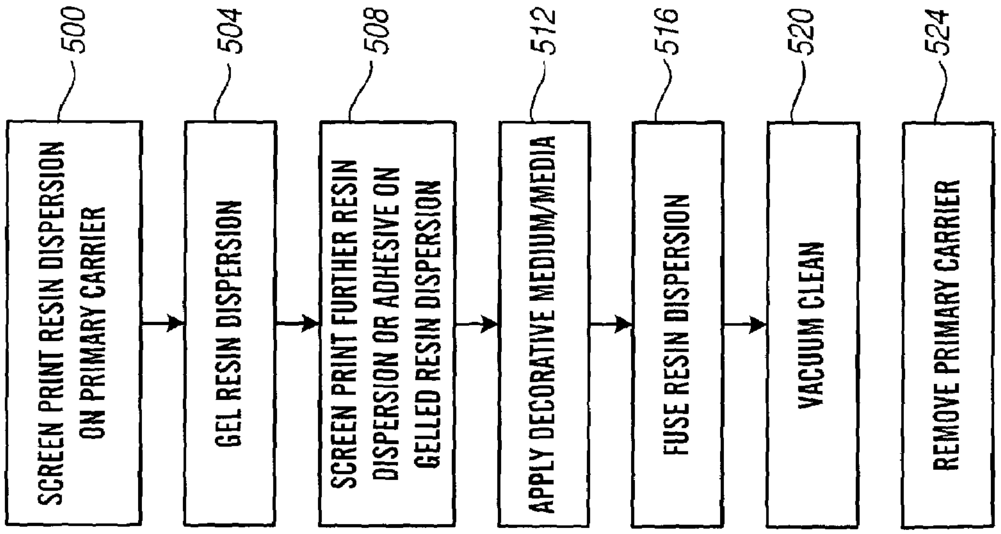
FIG. 17A is a flow chart of yet another alternative process embodiment and FIGS. 17B and 17C are cross sectional views, respectively, of an intermediate and a product of the process.
Figure 17B:
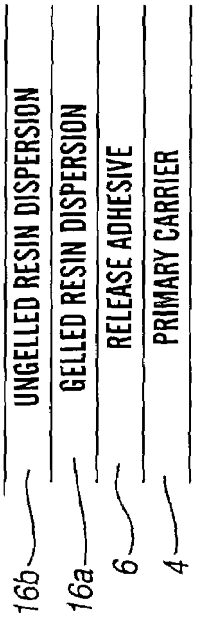
Figure 17C:
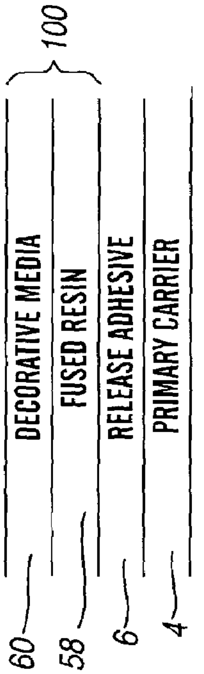

Yet another alternative embodiment is shown in FIGS. 17A–C. In step 500, a resin dispersion 16*a* is applied (e.g., screen printed) onto the release adhesive 6 in a desired pattern or shape or design. In step 504, the resin dispersion 16*a* is heated to a sufficient temperature (at or above the gel temperature and below the fused stage temperature) and held at the temperature for a sufficient time to gel (but not fuse) the resin dispersion. In step 508, a further resin dispersion layer 16*a* is screen printed onto the gelled resin dispersion layer 16*a*, typically in the same pattern as the gelled resin dispersion layer 16*a*. In step 512, decorative medium/media 60 is/are applied by suitable techniques to the (ungelled) resin dispersion layer. In step 516, the resin dispersion layers 16*a* and 16*b* are both heated to a sufficient temperature (above the fused stage temperature) and held at the temperature for a sufficient time to fuse the two layers. The fused stage will occur not only within each layer but also between the layers to form a composite layer 58 having a sufficient tensile strength to be removed from the primary carrier and resist normal tensile forces experienced during handling. The cumulative thickness of the two layers 16*a* and 16*b* is typically at least the thickness $T_R$ discussed above. In step 520, the decorative media 60 is vacuum cleaned, and in step 524 the design 100 is removed from the primary carrier 4. This process is desirable, such as flocking, where the decorative medium can penetrate through a single (ungelled) resin dispersion layer. The gelled layer 16*a* acts as a "backstop" and prevents the decorative media from passing completely through the resin dispersion 16, which can weaken the tensile strength of the gelled film.

Figure 18A:
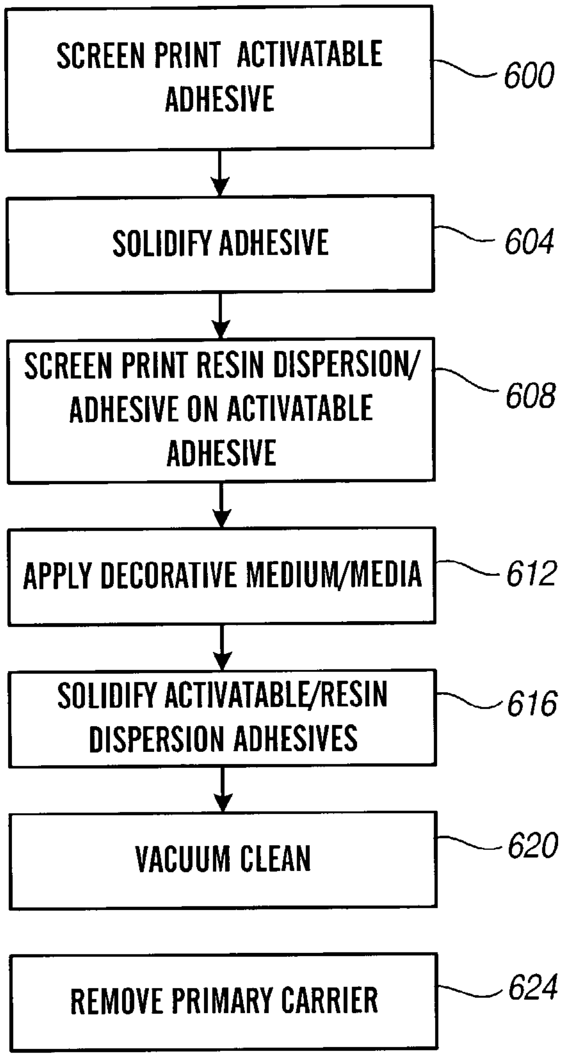
FIG. 18A is a flow chart of a further alternative process embodiment and FIG. 18B a cross sectional view of the product of the process.
Figure 18B:
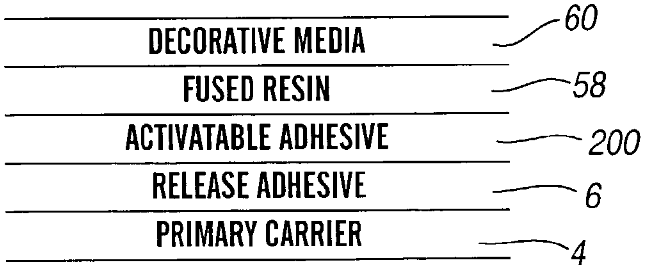

Yet another alternative embodiment is depicted in FIGS. 18A–B. In step 600, an activatable adhesive 200 is screen printed in a desired shape or pattern onto the release adhesive 6. The activatable adhesive 200 can be any adhesive that is activated by pressure, heat, or light. Preferred activatable adhesives include hotmelt thermoplastic or thermoset resins, such as an emulsion or dispersion of polyurethane, polyvinyl chloride, polyvinyl acetate, polyester, polyamide, acrylic, nylon, paraffin, and rubber derivative. A preferred activatable adhesive is Vestamelt™ manufactured by BGB Stockhausen Ag. As will be appreciated, the activatable adhesive 200, or particles thereof, could preferably be suspended in a liquid dispersion or emulsion so as to make it coatable by screen printing or other methods onto the primary carrier. In optional step 604, the activatable adhesive 200 is treated, typically by thermal techniques, to dry or cure or solidify the resin. Step 604 may be omitted depending on the materials used.

The resin dispersion is applied in the desired shape/pattern over the adhesive 200 in step 608. The thickness of the resin dispersion is typically the same as the thickness $T_R$ discussed above.

Typically, the activatable adhesive layer 200 does not commingle with the resin film dispersion 16. The two layers have differing functions and can interfere with one another if not kept separate (e.g., as two distinct layers). Separation can be achieved by a number of techniques, such as first solidifying (without fully activating) the activatable adhesive layer and/or using materials of substantially differing molecular weights and/or melting points. For example, the melting point and average molecular weight of the activatable adhesive 200 is typically lower than the melting point/molecular weight of the fused resin 58 formed from the resin dispersion 16.

The decorative media 60 is next applied in step 612, and in step 616 the resin dispersion is heated until it passes through the gelling and fusing stages.

The decorative media is then vacuum cleaned in step 620, and the design removed from the primary carrier in step 624.

This process is desirable where a simple thermal application process is desired to bond the design to a desired surface. As will be appreciated, the activatable adhesive layer will bond to the surface when placed under pressure and heated, such as by an iron or other thermal source and/or by a high frequency heat source.

Figure 19A:
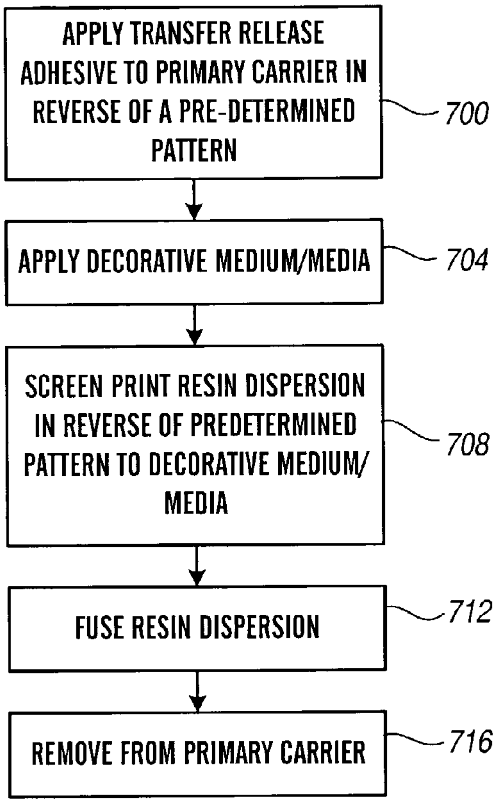
FIG. 19A is a flow chart of yet a further alternative process embodiment and FIG. 19B a cross sectional view of the product of the process.
Figure 19B:
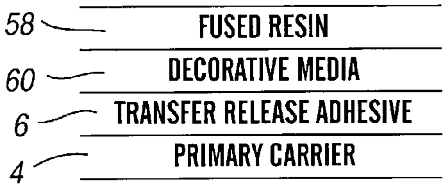

A further alternative embodiment is depicted in FIGS. 19A–B. In step 700, a transfer or temporary release adhesive 6 is screen printed onto the primary carrier 4 in a reverse perimeter shape of a predetermined pattern or design. The transfer release adhesive 6 can be any suitable material such as those set forth above, typically silicone wax. A preferred release adhesive is commercially available as LR 100, manufactured by Societe D'Enduction et de Flockage. In step 704, the decorative medium or media 60 is/are applied by suitable techniques to the transfer release adhesive 6 in the reverse shape of all or part of the predetermined pattern (or in the same pattern as the transfer release adhesive). Drying and cleaning is normally performed after this step to remove excess material. In step 708, the resin dispersion 16 is screen printed onto the transfer release adhesive/decorative media (to the media directly), typically in the reverse shape of the predetermined pattern (or the same pattern as the transfer release adhesive and decorative media). The thickness of the resin dispersion is typically the same as the thickness $T_R$ (discussed above). In step 712, the resin dispersion 16 is heated to a temperature at or above the fused stage temperature for a sufficient time to gel and fuse the resin dispersion and form resin film 58.

This process has a number of advantages relative to the process of U.S. Pat. No. 4,810,549, referred to previously. By way of reminder, the process of the '549 patent forms a design by screen printing a transfer release adhesive onto a primary carrier, screen printing successive colors of flock onto the transfer release adhesive in desired patterns, screen printing the protruding tips of the flock with a water-based acrylic binder (40–60% water), applying a nylon or polyester hot melt adhesive to the acrylic binder, and heating the design to cross link the binder and the adhesive. In contrast, the method of the present invention does not employ a water-based acrylic binder or nylon polyester hot melt adhesive. The design is preferably at least substantially free of acrylic binders and powdered adhesives, particularly nylon polyester hot melt adhesives. The resulting design has a higher tensile strength that the design of the '549 patent and requires fewer steps to produce.

Figure 20A:
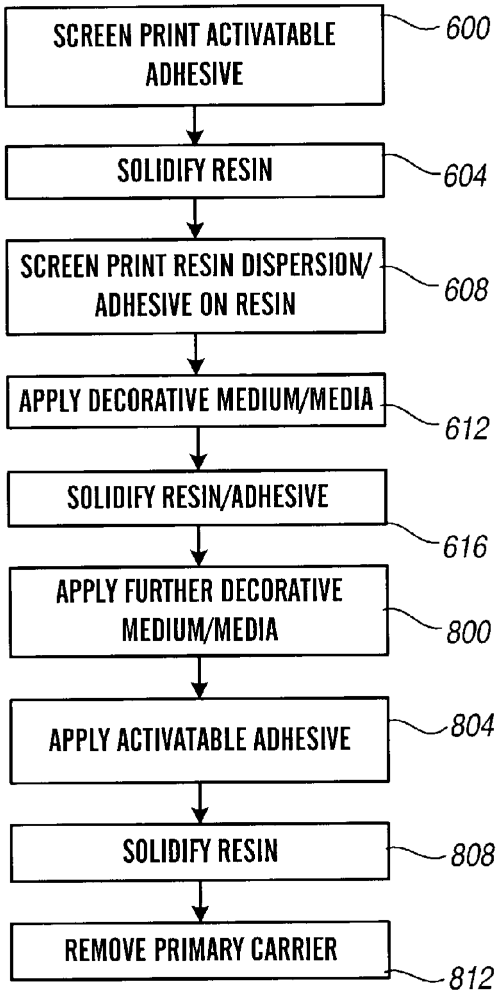
FIG. 20A is a flow chart of yet another alternative process embodiment and FIG. 20B a cross sectional view of the product of the process.
Figure 20B:
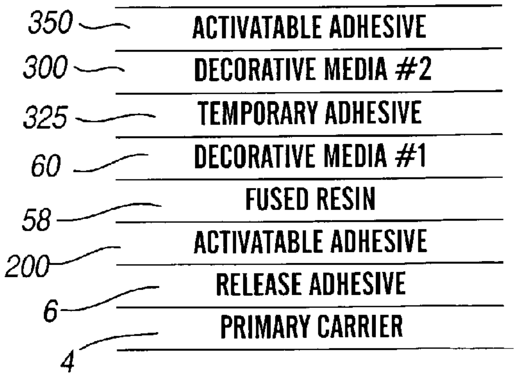

A further embodiment is depicted in FIGS. 20A–B. The process is similar to that of FIGS. 18A–B. Common reference numbers are used to refer to common process steps. Referring to FIGS. 20A–B, after step 616 other decorative media (such as reflective film, textiles, etc.) 300 is added (if desired) in step 800. The additional decorative media 300 is placed on top or next to the previously deposited decorative media 60. A temporary or permanent tack adhesive 325, such as the secondary adhesive discussed above, can be applied before, during, or after (as shown in FIG. 20B) application of the additional decorative media to hold the additional decorative media on the application surface. As will be appreciated, steps 616 and 800 can be reversed, particularly where step 612 is flocking and step 800 involves a non-flocking decorative medium (such as beads, glitter, reflective film, textiles, etc.). In step 804, an activatable adhesive 350 (e.g., thermoplastic or thermoset resin which may be applied as particles carried in a liquid dispersion or emulsion) is applied to the top of the additional decorative media (and/or fused resin film) to protect the additional decorative media and/or to join the previously deposited layers into a single, portable, heat seal transfer format. As will be appreciated, steps 804 and 800 can be reversed such that the activatable adhesive is applied between the additional decorative media 300 and the initially applied decorative media 60 and the temporary adhesive 325 omitted. In step 808, which is optional, the activatable adhesive is cured or dried. Finally, in step 812 the product is separated from the primary carrier 4.

Figure 21A:
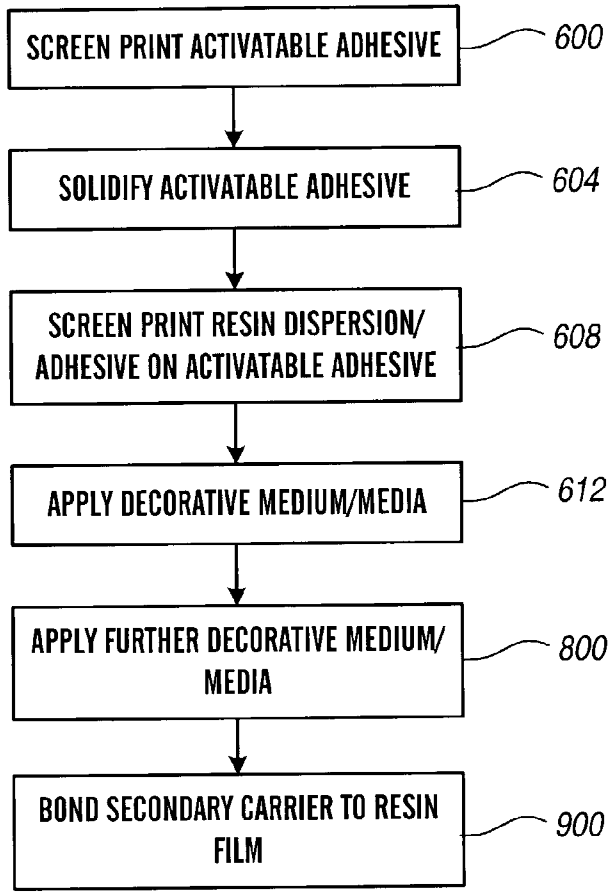
FIG. 21A is a flow chart of yet another alternative process embodiment and FIG. 21B a cross sectional view of the product of the process.
Figure 21B:
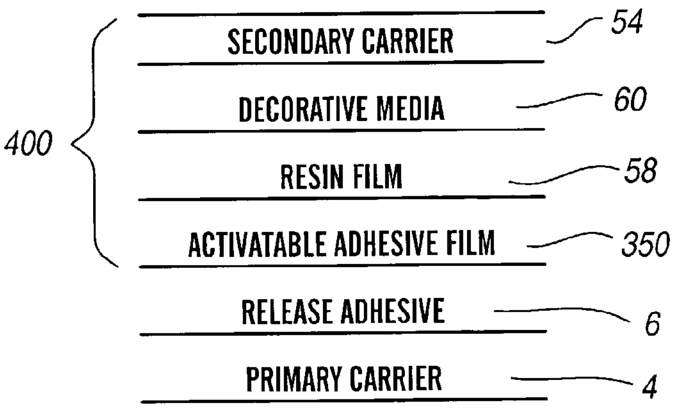

Yet another embodiment is depicted in FIGS. 21A and 21B. The process is similar to that of FIGS. 18A–B and 20A–B. Common reference numbers are used to refer to common process steps. Referring to FIGS. 21A and 21B, in step 900 a secondary carrier 54 is bonded to the decorative media 60/resin film 58 (formed from the resin dispersion) 16 on the opposite side of the design 400 from the primary carrier 4. The secondary carrier 54 provides the benefits discussed above with reference to FIGS. 15–16. Additionally, the secondary adhesive 56 used to bond the secondary carrier 54 to the design 400 permits additional step 800 to be performed as the added media will be adhered to the design by the adhesive 56 on the secondary carrier 54. As noted with reference to FIGS. 15–16, the bonding force between the secondary adhesive 56 and the decorative media 60 is greater than the bonding force between the release adhesive 6 and the activatable adhesive 350 to permit the primary carrier 4 to be removed from the activatable adhesive 350 without dislodging of the secondary carrier 54 from the media 60.

In any of the above processes, the decorative media can be a dyeable flocking material. Typically, the flocking material is a white polyester or other synthetic fiber. A suitable dye or pigment is then applied to the decorative media to cause dying or coloration of the media after application to the underlying (or overlying) layer (depending on the order in which the various layers are deposited). In one configuration, the flocking material is a white flock and a sublimation dye is added to the white flock by suitable techniques after application to the underlying (or overlying) layer. According to one technique, the sublimation dye is heated until the dye enters the vapor phase (by direct conversion of the solid phase to the vapor phase). The fibers are also heated to about the same temperature as the vaporized dye. The fiber accepts the vaporized dye, which dyes the fibers. According to another technique, the sublimination dye is put on a transfer carrier, such as a primary or secondary carrier noted previously, the transfer carrier is placed on the fibers and heated, and the dye is heat transferred onto the fibers. The dye is more colorfast on the fiber as the dye is absorbed by the fiber as opposed to simply being a surface coat on the fiber.

The above techniques can be used with other resin deposition techniques. For example, the resin can be deposited by sheet fed processing methods or continuous webline-type processing. In one process configuration, the resin is deposited using a small coating machine (e.g., a roller coater, knife-over-roll, etc.). The decorative media can then be applied by any suitable technique mixed media typically is separated by physical imaging techniques such as by screen printing, by using dies, by using templates, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streaming the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for forming a design for application to a substrate, comprising:

providing a primary carrier having a release adhesive;

screen printing a resin dispersion in a desired pattern onto the release adhesive; and contacting a selected decorative medium with at least most of the areal extent of the resin dispersion, wherein the resin dispersion comprises a resin that is weldable by radio frequency energy and wherein the resin dispersion is screen printed on only a portion of the screen printed surface of the resin dispersion.

2. The method of claim 1, wherein the decorative medium includes a plurality of flock fibers and wherein the contacting step comprises:

electrostatically applying the flock to the resin dispersion in the desired pattern, wherein the areal extent of the resin dispersion contacted with the flock fibers is coextensive with the predetermined pattern.

3. The method of claim 1, further comprising after the contacting step:

heating the resin dispersion to a temperature above a gel temperature and a fused stage temperature of the resin dispersion to form a fused resin film.

4. The method of claim 3, wherein a second bonding force between the resin film and the decorative medium is greater than a first bonding force between the release adhesive and the primary carrier and further comprising:

separating the primary carrier from the resin film.

5. The method of claim 1, further comprising after the contacting step:

applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

6. The method of claim 5, wherein the second release adhesive is an activatable adhesive.

7. The method of claim 5, further comprising:

removing the primary carrier from the resin dispersion before the secondary carrier is removed from the decorative medium.

8. The method of claim 1, wherein the screen printing step comprises:

heating the resin dispersion to form a gelled resin film; and screen printing resin dispersion onto the gelled resin film.

9. The method of claim 3, wherein a first bonding force between the release adhesive and the resin film is less than a second bonding force between the resin film and the decorative medium.

10. The method of claim 1, wherein the resin dispersion comprises at least one plasticizer and wherein the resin dispersion comprises a polymer or oligomer of a vinyl, an acetate, a urethane, an amide, and mixtures thereof.

11. The method of claim 10, wherein the resin dispersion comprises at least one resin is selected from the group consisting essentially of vinyls, urethanes, acetates, amides, and mixtures thereof.

12. The method of claim 10, wherein the resin dispersion further comprises at least one of a viscosity reducer, viscosity increaser, filler, thickener, and curing agent.

13. The method of claim 10, wherein the resin dispersion further comprises a pigment and a stabilizer to impact a selected coloration to a resin film formed from the resin dispersion.

14. The method of claim 1, wherein the resin dispersion is applied as a film having a thickness of at least about 6 mil.

15. A method for forming a design for application to a substrate, comprising:

(a) providing a primary carrier having a release adhesive;

(b) screen printing an activatable adhesive in a desirable perimeter pattern onto the release adhesive;

(c) screen printing a resin dispersion, different from the activatable adhesive, in the desired perimeter pattern, onto the activatable adhesive; and (d) contacting a decorative medium with the resin dispersion in the desired perimeter pattern, wherein the resin dispersion comprises a resin that is weldable by radio frequency energy.

16. The method of claim 15, further comprising after step (b) and before step (c):

activating the activatable adhesive.

17. The method of claim 15, wherein the decorative medium includes a plurality of flock fibers.

18. The method of claim 15, further comprising after step (d):

heating the resin dispersion to a temperature above a gel temperature and a fused stage temperature of the resin dispersion to form a fused resin film.

19. The method of claim 15, further comprising after step (d):

contacting a second decorative medium with the decorative medium; and screen printing a second activatable adhesive onto the second decorative medium.

20. The method of claim 19, further comprising:

activating at least the second activatable adhesive.

21. The method of claim 15, further comprising after the contacting step (d):

applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

22. The method of claim 18, wherein a first bonding force between the release adhesive and the activatable adhesive is less than each of a second bonding force between the activatable adhesive and the resin film and a third bonding force between the resin film and the decorative medium.

23. The method of claim 15, wherein the resin dispersion comprises at least one resin and at least one plasticizer.

24. The method of claim 23, wherein the at least one resin is selected from the group consisting essentially of vinyls, urethanes, nylons, acrylics, acetates, olefins, and mixtures thereof.

25. A method for forming a design for application to a substrate, comprising:

(a) providing a primary carrier having a release adhesive in a reverse shape of a predetermined pattern;

(b) applying a decorative medium onto the release adhesive in the reverse shape; and (c) screen printing a resin dispersion onto an exposed surface of the decorative medium.

26. The method of claim 25, further comprising after step (c):

heating the resin dispersion to a temperature above a gel temperature and a fused stage temperature of the resin dispersion to form a fused resin film.

27. The method of claim 25, wherein the decorative medium includes a plurality of flock fibers and wherein the resin is screen printed in the reverse shape of the predetermined pattern.

28. The method of claim 26, wherein a first bonding force between the release adhesive and the decorative medium is less than a second bonding force between the resin film and the decorative medium and wherein the areal extent of the applied decorative medium is coextensive with the areal extent of the screen printed resin dispersion.

29. The method of claim 25, wherein the resin dispersion comprises at least one resin and at least one plasticizer.

30. The method of claim 29, wherein the at least one resin is selected from the group consisting essentially of vinyls, urethanes, nylons, acrylics, acetates, olefins, and mixtures thereof.

31. A method for forming a design for application to a substrate, comprising:

(a) providing a primary carrier having a first release adhesive applied to at least one surface of the primary carrier;

(b) applying a permanent adhesive to the first release adhesive;

(c) applying a decorative medium to the permanent adhesive;

(d) applying a second release adhesive to one of an exposed surface of the decorative medium and a secondary carrier; and (e) contacting the applied second release adhesive to the other of the exposed surface of the decorative medium and the secondary carrier.

32. The method of claim 31, wherein a first bonding force between the first release adhesive and the permanent adhesive is less than a second bonding force between the second release adhesive and the decorative medium.

33. The method of claim 31, wherein the permanent adhesive is an activatable adhesive.

34. The method of claim 31, wherein the permanent adhesive is a resin dispersion.

35. The method of claim 31, wherein the release adhesive is distributed in a first pattern and the permanent adhesive in a second, different pattern.

36. The method of claim 31, wherein the permanent adhesive is distributed in a first pattern and the decorative medium in a second, different pattern.

37. A method for forming a design for application to a substrate, comprising:

providing a primary carrier having a release adhesive;

screen printing a resin dispersion onto the release adhesive; and contacting a selected decorative medium with the resin dispersion, wherein the resin dispersion comprises a resin that is weldable by radio frequency energy and wherein the resin dispersion is applied as a film having a thickness of at least about 6 mil.

38. The method of claim 37, wherein the decorative medium includes a plurality of flock fibers, wherein the resin dispersion is applied in a desired pattern, and wherein the contacting step comprises:

electrostatically applying the flock to the resin dispersion in the desired pattern, wherein the areal extent of the resin dispersion contacted with the flock fibers is coextensive with the predetermined pattern.

39. The method of claim 37, wherein the decorative medium is contacted with at least most of the screen printed resin dispersion and further comprising after the contacting step:

heating the resin dispersion to a temperature above a gel temperature and a fused stage temperature of the resin dispersion to form a fused resin film.

40. The method of claim 37, further comprising after the contacting step:

applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

41. The method of claim 40, wherein the second release adhesive is an activatable adhesive.

42. The method of claim 40, further comprising:

removing the primary carrier from the resin dispersion before the secondary carrier is removed from the decorative medium.

43. A method for forming a design for application to a substrate, comprising:

providing a primary carrier having a release adhesive;

screen printing a resin dispersion onto the release adhesive;

contacting a selected decorative medium with the resin dispersion, wherein the resin dispersion comprises a resin that is weldable by radio frequency energy; and applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

44. The method of claim 43, wherein the second release adhesive is an activatable adhesive.

45. The method of claim 43, further comprising:

removing the primary carrier from the resin dispersion before the secondary carrier is removed from the decorative medium.

46. The method of claim 43, wherein the screen printing step comprises:

heating the resin dispersion to form a gelled resin film; and screen printing resin dispersion onto the gelled resin film.

47. The method of claim 46, wherein a first bonding force between the release adhesive and the resin film is less than a second bonding force between the resin film and the decorative medium.

48. The method of claim 1, wherein the resin dispersion comprises at least one plasticizer, wherein the resin dispersion comprises a polymer or oligomer of a vinyl, an acetate, a urethane, an amide, a vinyl, and mixtures thereof, and, wherein the resin dispersion comprises at least one of a viscosity reducer, viscosity increaser, filler, thickener, and curing agent.

49. The method of claim 48, wherein the resin dispersion further comprises a pigment and a stabilizer to impact a selected coloration to a resin film formed from the resin dispersion.

50. A method for forming a design for application to a substrate, comprising:

providing a primary carrier having a release adhesive;

screen printing a resin dispersion onto the release adhesive;

contacting a selected decorative medium with the resin dispersion, wherein the resin dispersion comprises a resin that is weldable by radio frequency energy;

heating the resin dispersion to a temperature above a gel temperature and a fused stage temperature of the resin dispersion to form a fused resin film, wherein a first bonding force between the release adhesive and the resin film is less than a second bonding force between the resin film and the decorative medium.

51. The method of claim 50, further comprising:

applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

52. The method of claim 51, wherein the second release adhesive is an activatable adhesive.

53. The method of claim 51, further comprising:

removing the primary carrier from the resin dispersion before the secondary carrier is removed from the decorative medium.

54. The method of claim 50, wherein the screen printing step comprises:

heating the resin dispersion to form a gelled resin film; and screen printing resin dispersion onto the gelled resin film.

55. The method of claim 50, wherein a first bonding force between the release adhesive and the resin film is less than a second bonding force between the resin film and the decorative medium.

56. The method of claim 50, wherein the resin dispersion comprises at least one plasticizer, wherein the resin dispersion comprises a polymer or oligomer of a vinyl, an acetate, a urethane, an amide, a vinyl, and mixtures thereof, and, wherein the resin dispersion comprises at least one of a viscosity reducer, viscosity increaser, filler, thickener, and curing agent.

57. The method of claim 56, wherein the resin dispersion further comprises a pigment and a stabilizer to impact a selected coloration to a resin film formed from the resin dispersion.

58. A method for forming a design for application to a substrate, comprising:

(a) providing a primary carrier having a release adhesive;

(b) screen printing an activatable adhesive onto the release adhesive;

(c) screen printing a resin dispersion, different from the activatable adhesive, onto the activatable adhesive;

(d) contacting a decorative medium with the resin dispersion; and (e) heating the resin dispersion to a temperature above a gel temperature and a fused stage temperature of the resin dispersion to form a fused resin film.

59. The method of claim 58, further comprising after step (b) and before step (c):

activating the activatable adhesive.

60. The method of claim 58, wherein the decorative medium includes a plurality of flock fibers and wherein an areal extent of the resin dispersion contacted with the decorative medium is at least most of the areal extent of the resin dispersion.

61. The method of claim 58, further comprising after step (d):

contacting a second decorative medium with the decorative medium; and screen printing a second activatable adhesive onto the second decorative medium.

62. The method of claim 61, further comprising:

activating at least the second activatable adhesive.

63. The method of claim 61, further comprising after the contacting step (d):

applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

64. The method of claim 63, wherein a first bonding force between the release adhesive and the activatable adhesive is less than each of a second bonding force between the activatable adhesive and the resin film and a third bonding force between the resin film and the decorative medium.

65. The method of claim 58, wherein the resin dispersion comprises at least one resin and at least one plasticizer and wherein the at least one resin is selected from the group consisting essentially of vinyls, urethanes, nylons, acrylics, acetates, olefins, and mixtures thereof.

66. A method for forming a design for application to a substrate, comprising:

(a) providing a primary carrier having a release adhesive;

(b) screen printing an activatable adhesive onto the release adhesive;

(c) screen printing a resin dispersion, different from the activatable adhesive, onto the activatable adhesive; and (d) contacting a decorative medium with the resin dispersion, wherein the resin dispersion comprises at least one resin and at least one plasticizer.

67. The method of claim 66, further comprising after step (b) and before step (c):

activating the activatable adhesive.

68. The method of claim 66, wherein the decorative medium includes a plurality of flock fibers and wherein an areal extent of the resin dispersion contacted with the decorative medium is at least most of the areal extent of the resin dispersion.

69. The method of claim 66, further comprising after step (d):

heating the resin dispersion to a temperature above a gel temperature and a fused stage temperature of the resin dispersion to form a fused resin film.

70. The method of claim 66, further comprising after step (d):

contacting a second decorative medium with the decorative medium and screen printing a second activatable adhesive onto the second decorative medium.

71. The method of claim 66, further comprising after the contacting step (d):

applying a second release adhesive to the exposed surface of the decorative medium, wherein a first surface of the second release adhesive is bonded to the decorative medium and an opposing second surface of the second release adhesive is bonded to a secondary carrier and wherein a first bonding force between the release adhesive and the primary carrier is less than a second bonding force between the second release adhesive and the secondary carrier.

72. The method of claim 66, wherein a first bonding force between the release adhesive and the activatable adhesive is less than each of a second bonding force between the activatable adhesive and the resin film and a third bonding force between the resin film and the decorative medium.

* * * * *